(12) United States Patent
Holmes et al.

(10) Patent No.: US 8,199,648 B2
(45) Date of Patent: Jun. 12, 2012

(54) FLOW CONTROL IN A VARIABLE LATENCY SYSTEM

(75) Inventors: Steven P. Holmes, Wake Forest, NC (US); Paramananda Ponnaiyan, Bangalore (IN); Leonardo Amatori, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 362 days.

(21) Appl. No.: 11/773,351

(22) Filed: Jul. 3, 2007

(65) Prior Publication Data

US 2009/0010157 A1 Jan. 8, 2009

(51) Int. Cl.
*H04L 12/28* (2006.01)
(52) U.S. Cl. ........................................ 370/231; 370/235
(58) Field of Classification Search .......... 370/230–232, 370/235, 825.07; 711/167
See application file for complete search history.

(56) References Cited

U.S. PATENT DOCUMENTS

| | | | | |
|---|---|---|---|---|
| 5,459,455 A * | 10/1995 | Sato | ............................. | 370/410 |
| 2004/0057378 A1 * | 3/2004 | Gronberg | ..................... | 370/230 |
| 2004/0105388 A1 * | 6/2004 | Wilkins et al. | ................. | 370/235 |
| 2004/0257991 A1 * | 12/2004 | Sterne et al. | ................... | 370/230 |
| 2006/0034286 A1 * | 2/2006 | Koning et al. | ................. | 370/394 |
| 2007/0271435 A1 * | 11/2007 | Jeddeloh et al. | .............. | 711/167 |
| 2008/0123526 A1 * | 5/2008 | Hadas et al. | ................... | 370/231 |

* cited by examiner

*Primary Examiner* — Kwang B Yao
*Assistant Examiner* — Syed M Bokhari
(74) *Attorney, Agent, or Firm* — Schwegman, Lundberg & Woessner, P.A.

(57) ABSTRACT

A device and method for packet flow control is described. The method may comprise, at a packet sender device, adding a flow control identifier to a packet and transmitting a packet with the packet flow control identifier to a packet receiver device over a data path. Thereafter, the packet receiver device may receive, from the packet receiver device, flow control data that includes a received flow control identifier generated in response to the sent flow control identifier. The sent flow control identifier may then be compared with the received flow control identifier and a state of a receiver buffer at the receiver packet device may be estimated based on the comparison. In an example embodiment, at the packet sender device, a flow control instruction may be added to the packet to instruct the packet receiver device to enter a "no transmit" state.

18 Claims, 9 Drawing Sheets

| SENDER BUFFER REGISTER ||||||
| FLOW CONTROL IDENTIFIER | RECEIVED FLOW CONTROL IDENTIFIER | FORCED FLOW CONTROL IDENTIFIER | FLOW CONTROL INSTRUCTION RECEIVED | ESTIMATED BUFFER DEPTH |
|---|---|---|---|---|
| 0 | 0 | 0 | 0 | < VALUE |
| 0 | 0 | 0 | 0 | < VALUE |
| 1 | 1 | 1 | 1 | = VALUE |

FIG. 4

| RECEIVER BUFFER REGISTER | | | |
|---|---|---|---|
| FLOW CONTROL IDENTIFIER | FORCED FLOW CONTROL IDENTIFIER | TRANSMISSION FLOW INSTRUCTION | ACTUAL BUFFER DEPTH |
| 0 | 0 | 0 | < VALUE |
| 0 | 0 | 0 | < VALUE |
| 1 | 1 | 1 | = VALUE |
| ⌐102 | ⌐104 | ⌐106 | ⌐108 |

*FIG. 5*

| 31 | 30 | 29 | 28 | 27 | 26 | 25:24:00 | 23:16 | 15:00 |
|---|---|---|---|---|---|---|---|---|
| xoff | err | eop | sop | rc | rsvd | align | rsvd | byte_count |

FLOW CONTROL IN A VARIABLE LATENCY SYSTEM

FIELD

The present disclosure relates generally to the field of flow control in a packet communication system. In one example embodiment, the disclosure relates to a method and a system to improve flow control in a variable latency system.

BACKGROUND

In packet communication systems it may be advantageous to have the ability to send data at the full rate that an interface can support. These systems usually contain several data path elements which must transfer packets from one element to another element, each element having its own local packet buffer(s). When these data path elements are connected with shared busses the latency of transferring data packets between the elements can become long and variable, thus making it difficult for the sender of packets to know how much buffer space the receiver has left.

In circumstances where flow control data is to be transferred over this type of variable latency interface the problem may be compounded since the sender device does not know whether the last flow control data received from the receiver device corresponds with the last packet data transmitted by the sender. This can result in overflows (e.g., resulting in lost packets) and underflows (e.g., resulting in under utilization) of the receiver's buffers.

It will be appreciated that this may particularly be a problem in communications systems where a central processing unit (CPU) with large memory buffers sends data to a communication device with relatively smaller memory buffers. In such systems the CPU will need to estimate the capacity of the receiving communication device's buffer to assure that it does not overflow with transmit packets. In systems with the possibility of long latencies, the CPU will need to go into a transmitter 'off' state or XOFF state (e.g., buffer full) before the packet receiving device has actually sent an XOFF command. Variable latency may further result in edge cases where the receiving device does not go into an XOFF state as expected but remains in transmitter 'on' or XON state (e.g., buffer not yet full), since its buffers may have cleared before the packet that was expected to turn it XOFF arrived.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

In the following description, for purposes of explanation, numerous specific details are set forth in order to provide a thorough understanding of embodiment(s) of the present disclosure. It will be evident, however, to one skilled in the art that the present disclosure may be practiced without these specific details.

Overview

A device and method for packet flow control is described. The method may comprise, at a packet sender device, adding a flow control identifier to a packet and transmitting a packet with the packet flow control identifier to a packet receiver device over a data path. Thereafter, the packet receiver device may receive, from the packet receiver device, flow control data that includes a received flow control identifier generated in response to the sent flow control identifier. The sent flow control identifier may then be compared with the received flow control identifier and a state of a receiver buffer at the receiver packet device may be estimated based on the comparison. In an example embodiment, at the packet sender device, a flow control instruction may be added to the packet to instruct the packet receiver device to enter a "no transmit" state.

Example Embodiments

Figure 1:
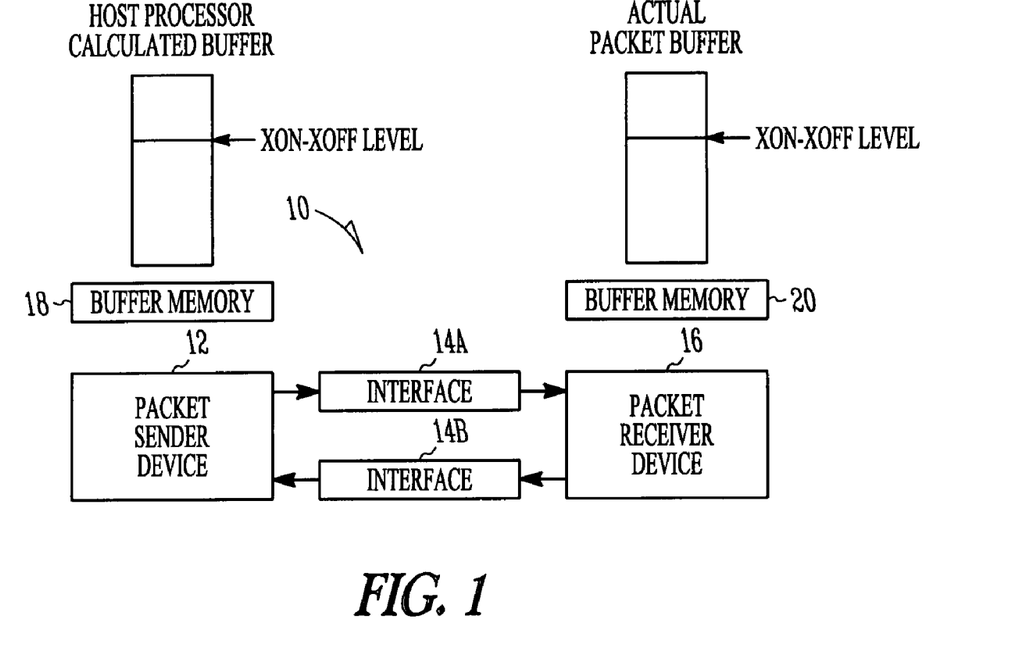
FIG. 1 shows an example of a system in which an example embodiment of the disclosure may be implemented.

Referring to FIG. 1, reference numeral 10 generally indicates a system, in accordance with an example embodiment, to transmit data over an interface. The system 10 may be deployed at any node forming part of a network. For example, the system 10 may be deployed where a Peripheral Component Interconnect (PCI) bus is used to interconnect peripherals with a forwarding processor.

In an example embodiment, the system 10 comprises a packet sender device 12 which may, for example, be a host processor. The packet sender device 12 is connected via one or more interfaces 14a and 14b to a packet receiver device 16 (e.g., a communication device such as a Frame Engine Data Link Manager (Freedm)). As described in more detail below, in an example embodiment, the sender device 12 may add flow control data (e.g., flow control identifier and flow control instruction bits) to a packet header to enhance flow control synchronization. For example, the flow control data may be used to synchronize an actual state of a buffer at the packet receiver device 16, and a calculated or estimated state of this buffer calculated at the packet sender device 12.

Although not shown by FIG. 1, the interfaces 14a, 14b may comprise one or more data path elements which are to transfer data in the form of packets from the packet sender device 12 to the packet receiver device 16. Each data path element may transfer data packets to another element, and each data element may have its own local packet buffers. Information on the local packet buffers may be maintained in buffer registers.

When the data elements are connected with shared busses (e.g., a PCI bus interconnecting a network interface card or device and a host processor) the latency of transferring data between the elements may become long and variable, which may result in the packet sender device 12 being unable to accurately estimate or determine a state of a buffer (e.g., how full the buffer is) at the packet receiver device 16. Standalone XON and XOFF signaling may result in incorrect estimates due to variable latency in a flow control signaling path.

In one example embodiment, the interfaces 14a and 14b may form part of a PCI arrangement. A PCI bus may be used to attach peripheral devices, such as the packet receiver device 16, to a mother board of a computer. Thus, the packet sender device 12 may be a host processor of a computing device and the packet receiver device 16 may be a network interface card. It will be appreciated that the interfaces 14a and 14b may be any type of communication interface and is not restricted to a PCI (including PCI express) bus or the like.

In the system 10 of FIG. 1, the packet sender device 12 is provided with information to determine if flow control data received from the packet receiver device 16 corresponds to the last packet data that the packet sender device 12 transmitted to the packet receiver device 16, and not to earlier flow control data that may have been delayed. Thus, in an example embodiment, transmitter 'on' (XON) and transmitter 'off' (XOFF) flow control synchronization may be enhanced so that the packet sender device 12 may verify that returned packet flow control information from the packet receiver device 16 (or any packet receiving entity) is up to date.

In an example embodiment, the packet sender device 12 may have access to buffer memory 18 that maintains a buffer register. Similarly, the packet receiver device 16 may also have access to receiver buffer memory 20 that maintains a buffer register. The buffer memory 18 and 20 may be external to the packet sender device 12 and/or the packet receiver device 16, as shown by FIG. 1. However, in other example embodiments, the buffer memory may form part of the respective devices, as is shown by way of example in FIGS. 2 and 3.

In the example system 10, data is communicated between the packet sender device 12 and the packet receiver device 16 by means of direct memory access (DMA). DMA is a feature of computers that allows certain hardware subsystems to access system memory for reading and/or writing independently of a processor (e.g., a central processing unit (CPU)). However, it will be appreciated that data may be communicated between the packet sender device 12 and the packet receiver device 16 by any other communication protocol or methodology.

Figure 2:
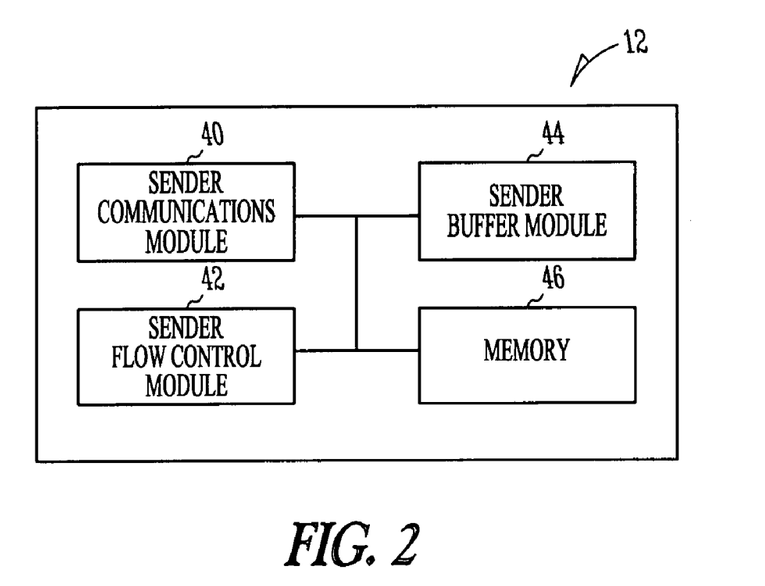
FIG. 2 shows an example packet sender device in the form of a host processor that may form part of the system shown in FIG. 1.

Referring to FIG. 2, example detail of the packet sender device 12 is shown when the packet sender device 12 is in the form of a host processor. As mentioned above, the packet sender device 12 may be deployed in any network device which receives packet communications for further transmission to other devices via a network.

In FIG. 2 the packet sender device 12 is shown to include a sender communications module 40, a sender flow control module 42, a sender buffer module 44 and memory 46. The sender communications module 40 may be configured to transmit data packets over an interface, e.g., a variable latency data path such as a PCI bus, PCIe bus or the like to a packet receiver device, e.g., the packet receiver device 16 of FIG. 1. The sender communications module 40 may transmit at least one packet with a flow control identifier (e.g., a packet flow identifier bit or bits) which may be managed by the sender flow control module 42. The sender communications module 40 may further receive, from other devices, e.g., the packet receiver device 16, flow control data that includes a received flow control identifier.

Flow control data may be used by the packet sender device 12 and the packet receiver device 16 to manage a rate of packet transmission between the two devices. The flow control data may include a flow control instruction such as XON or XOFF. XON/XOFF relate to a data flow communications protocol whereby the receiver device 16 sends an XOFF (e.g., transmitter 'off', buffer full) instruction to the sender device 12 when the buffer(s) of the receiver device 16 has reached a set limit and the receiver device 16 can no longer process further data packets it receives. In response to receiving the XOFF command, the sender device 12 may then suspend the transmission of data packets, until an XON (e.g., transmitter 'on', buffer not yet full) instruction is received from the receiver device 16. The receiver device 16 transmits an XON command once it can again accept further data packets, e.g., when the buffers of the receiver device have cleared sufficiently. In conventional systems a receiver device acts autonomously, and thus independently of a sender device, in generating XON and XOFF commands. In accordance with an example embodiment, as described herein, the sender device 12 may command to receiver device to enter into an XOFF state.

In an example embodiment, the sender flow control module 42 may add the flow control identifier mentioned above to a packet to be transmitted to the packet receiver device 16. For example, the flow control identifier may be a bit that is added by the sender flow control module 42 to the packet header of a packet prior to the transmission of the packet to the packet receiver device 16. The flow control identifier may act as a "trust return code" bit that is reflected back to the sender device 12 to identify new flow control updates. In an example embodiment, the flow control identifier a bit that is toggled from a first value to a second value, e.g., "0" to "1", in order to indicate different flows of data packets transmitted by the packet sender device 12. In an example embodiment, the present/current value of the flow control identifier may be stored at the packet sender device 12, for example, in a buffer register. Both the sender flow control module 42 and the sender buffer module 44 may have access to the memory 46.

The sender flow control module 42 may, in addition to the packet identifier, add a forced flow control instruction, e.g., an XOFF instruction, to the packet to be transmitted to the packet receiver device 16. The forced flow control instruction may force a channel associated with the packet at the receiver device 16 into an XOFF state. As in the case with the flow control identifier, the flow control instruction may be a bit that is added to the packet header of the packet to be transmitted to the packet receiver device 16.

As mentioned above, the flow control instruction may be transmitted to the packet receiver device 16 to instruct the packet receiver device 16 to change the transmission flow instruction that is to be sent back to the packet sender device 12 after the data packet has been received. The flow control data sent back to the packet receiver device 12 is changed to a "no transmit" status or an XOFF state in order to assure that the XON to XOFF or XOFF to XON transitions that may be required by the packet sender device 12 occur. These state transitions may be used to generate an interrupt or start a specific software process.

The state of the buffer memory 18 is an estimated copy or emulation of the state of the receiver buffer memory 20. Thus, during operation, the sender buffer module 46 may identify an estimated buffer depth value of its local buffer register (e.g., in the memory 46) which is thus an estimated buffer depth value of the receiver buffer memory 20. This estimated buffer depth value is thus a calculated value, maintained by the packet sender device 12, and provides an estimate as to how full the buffer of the packet receiver device 16 is. As described in more detail below, the flow control identifier may be used to synchronize the state of the buffer provided at the packet sender device 12 and the packet receiver device 16. The sender buffer module 46 may thus more accurately determine whether the buffer depth in the receiver buffer memory 20 has reached a predetermined minimum value. In response to determining that the buffer depth value has reached the predetermined minimum value, the sender buffer module 44 may modify the flow control identifier (e.g., set a bit in the next packet to force the XOFF state in the packet receiver device 16). In order to accomplish this, the sender buffer module 44 may compare a received flow control identifier which is received by the sender communications module 40 from the packet receiver device 16 with the flow control identifier (corresponding to a previously sent packet) stored in a buffer descriptor table of the packet sender device 12. By comparing the received flow control identifier with the sent flow control identifier stored in the buffer register, the sender buffer module 44 is able to determine whether the flow control data (XON or XOFF) received from the packet receiver device 16 is generated in response to the last packet transmitted by the packet sender device 12.

Figure 3:
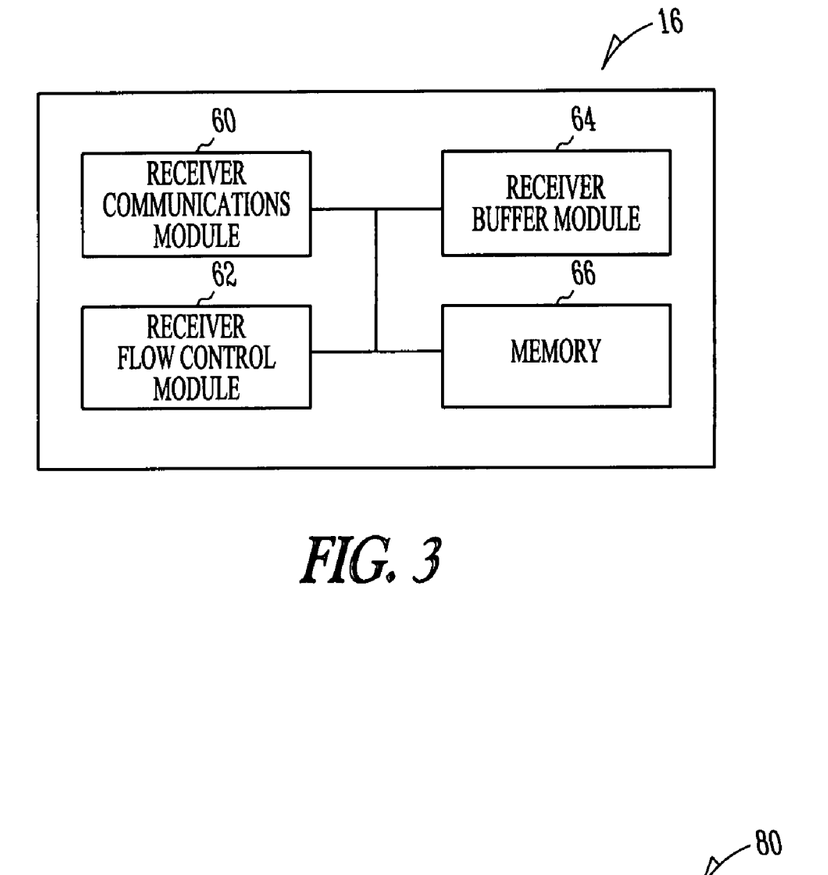
FIG. 3 shows an example packet receiver device in the form of a communications device that may form part of the system shown in FIG. 1.

FIG. 3 shows example detail of the packet receiver device 16. The packet receiver device 16 may, for example, be a communications device such as a network interface card. It will be appreciated that the packet receiver device 16 may be deployed in any network device which receives packet communications from other subsystems on a network node.

The packet receiver device 16 is shown by way of example to comprise a receiver communications module 60, a receiver flow control module 62, a receiver buffer module 64 and memory 66. Similar to the memory 46 of the packet sender device 12, the memory 66 may either form part of the packet receiver device 16 (as shown in FIG. 3), or may alternatively be separate from the packet receiver device 16, although accessible by the packet receiver device 16 (as shown by FIG. 1).

In an example embodiment, the communications module 60 receives a packet with a flow control identifier (e.g., a trust return code bit set in the packet as described above) from the packet sender device 12. This packet may be received via the interface 14*a*, e.g. which may form part of a variable latency data path such as a PCI bus or the like. As described above, the receiver communications module 60 may further be configured to transmit flow control data back to the packet sender device 12. For example, the receiver buffer module 64 may, in response to receiving the flow control instruction described above determine whether its buffer depth has reached a predetermined minimum value. In response to the flow control instruction, the receiver flow control module 62 may force the packet receiver device 16 to generate its no transmit or XOFF command and enter an XOFF state for a predetermined number of polling intervals (e.g., 3 polling intervals). However, in response to determining that the buffer depth of the receiver buffer memory 20 has not reached a predetermined minimum value, the receiver buffer module 64 may change the transmission flow command to the "transmit" status (e.g., XON) and an XON flow instruction may then be transmitted back to the packet sender device 12.

In one example embodiment, the sender flow control module 42 of the packet sender device 12 adds the flow control identifier to the header of the data packet. In the event that the received flow control identifier received back from the packet receiver device 16 matches the flow control identifier included in the sent packet, the packet sender device 12 may conclude the buffers at the packet sender device 12 and the packet receiver device 16 are synchronized.

In another example embodiment, the packet sender device 12 may combine the use of the flow control identifier (e.g., trust return code or synchronization bit) with the forced flow control instruction (e.g., using a force XOFF bit). For example, the sender buffer module 44 may calculate the estimated size or depth of the receiver's buffer and, if sending of a further packet is expected to push the packet receiver device 16 into the XOFF state, the packet sender device 12 may set the forced flow control bit to force the packet receiver device 16 into a "no transmit" state. Further, the value of the flow control identifier in the packet header may be toggled and the buffer register may be updated with the latest value of the flow control identifier. Thus, the state of the interface associated with this channel may be forced into the XOFF state, in response to which the packet receiver device 16 may respond by transmitting an XOFF command back to the packet sender device 12.

In the event that the transmitted packet does not force the channel into the XOFF state, the channel may go immediately into the XON state (or after a predetermined interval that may be programmable). The packet receiver device 16 may then transmit the XON command to the packet sender device 12. Queuing of packets at the packet sender device 12 may then be interrupted and packets may then once again be transmitted to the packet receiver device 16.

In one example embodiment, the packet sender device 12 may reset the flow control identifier to "0" when an interrupt or an XON instruction is received.

Figure 4:
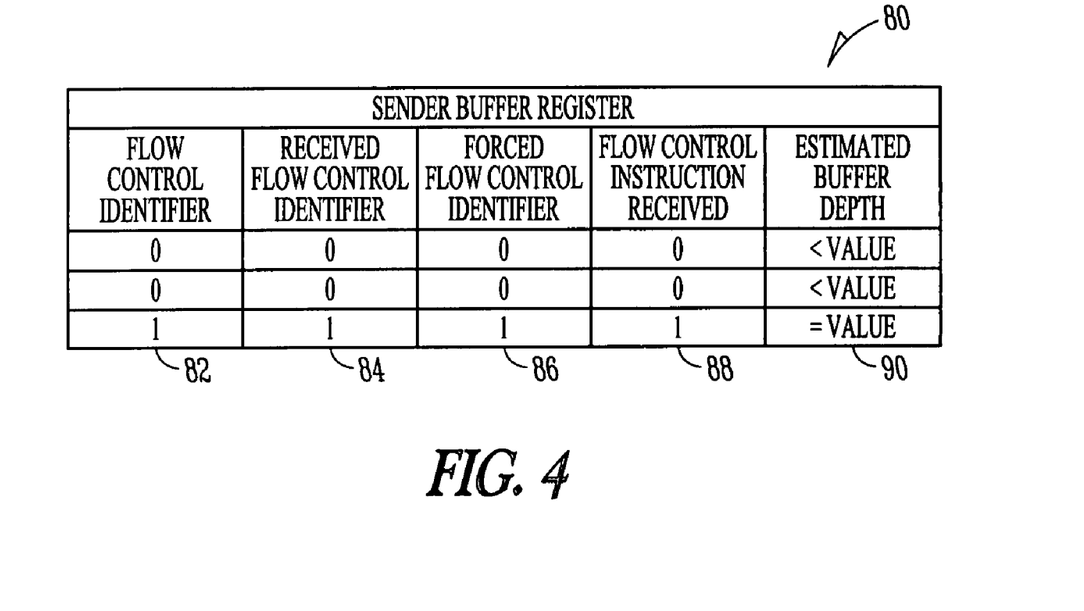
FIG. 4 shows an example of a sender buffer register that may be maintained by the packet sender device of FIG. 2.

An example embodiment of a sender buffer register 80 that may be maintained by the packet sender device 12 is shown in FIG. 4. The sender buffer register 80 may, for example, include multiple fields. For example the sender buffer register 80 is shown to comprise a flow control identifier field 82 that maintains values of the packet flow control identifiers transmitted in the packet headers of the last transmitted data packets. A received flow control identifier field 84 maintains values of the flow control identifiers in packets received from the packet receiver device 16. As mentioned, the packet sender device 12 may reset the value of the flow control identifier to "0" when the packet sender device 12 receives an interrupt or a transmission flow instruction corresponding to a "transmit" status or XON.

The sender buffer register 80 may also comprise a forced flow control instruction field 86. For example, the forced flow control instruction field may be set to "1" to instruct the packet receiver device 16 to force the packet receiver device 16 into the XOFF state. In an example embodiment, the forced flow control instruction field 86 may only be set to "1" when the estimated depth of the buffer has reached the predetermined minimum.

The sender buffer register 80 may also include a flow control instruction received field 88 for received packet flow control identifiers. The flow control instruction received field 88 may indicate whether the packet flow information received from the packet receiver device 16 is synchronized with the information transmitted by the packet sender device 12.

The sender buffer register 80 may also include an estimated buffer depth field 90 which indicates if the estimated or calculated depth of the receiver buffer is greater than, less than or equal to the value of the packet receiver device 16. This sender buffer register 80 may be maintained throughout the transmission of data packets to the packet receiver device 16 in order to calculate whether a minimum threshold value has been reached. In an example embodiment, the estimated buffer depth value may be equal the number of bytes transmitted minus the interface byte rate/time. It will however be appreciated that any conventional threshold criteria or algorithms may be used.

Figure 5:
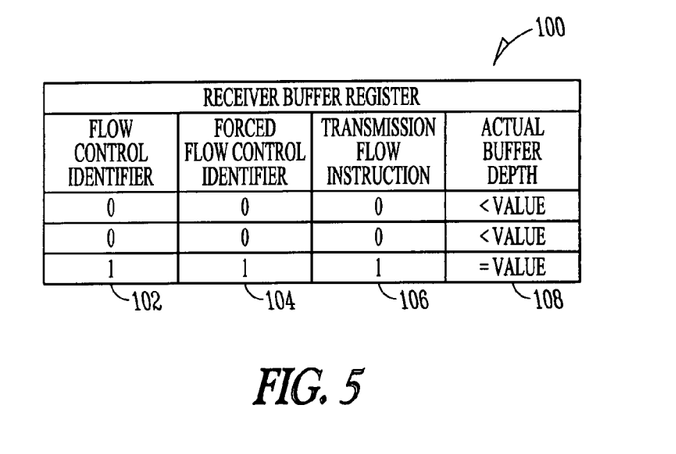
FIG. 5 shows an example of a receiver buffer register that may be maintained by the packet receiver device of FIG. 3.

An example embodiment of a receiver buffer register 100 that may be maintained by the packet receiver device 16 is shown in FIG. 5. In an example embodiment, this receiver buffer register 100 may be maintained in memory 66 that may, but need not, form part of the packet receiver device 16.

Similar to the sender buffer register 80, the receiver buffer register 100 may include fields for a flow control identifiers 102 received from the packet sender device 12, a forced flow control instructions 104 also received from the packet sender device 12, and transmission flow instructions 106 which are determined by the packet receiver device 16. An actual buffer depth field 108 may also be maintained in the receiver buffer register 100 and may correlate to the forced control instruction 104 and/or the transmission flow instruction 106. These fields are updated with reference to the data packets received from the packet sender device 12 and with reference to the actual depth of the buffer of the packet receiver device 16.

Figure 6:
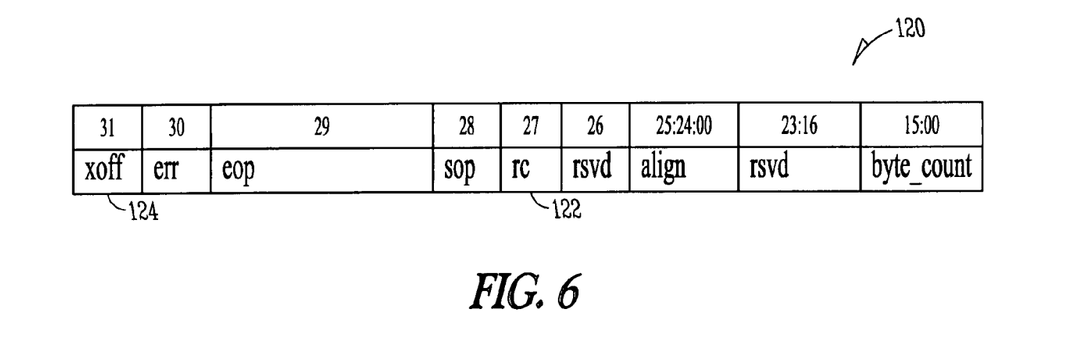
FIG. 6 shows an example of a packet header to be transmitted by the packet sender device of FIG. 2 with a packet to the packet receiver device of FIG. 3.

FIG. 6 shows an example of a packet header 120 forming part of a data packet to be transmitted by the packet sender device 12 of FIG. 2 to the packet receiver device 16. Reference numeral 122 shows the flow control identifier which may be included in the packet header, while reference numeral 124 shows the forced flow control instruction which may also be included in the packet header. It will be appreciated that packet headers need not have the specific format as shown by the packet header of FIG. 6.

Figure 7:
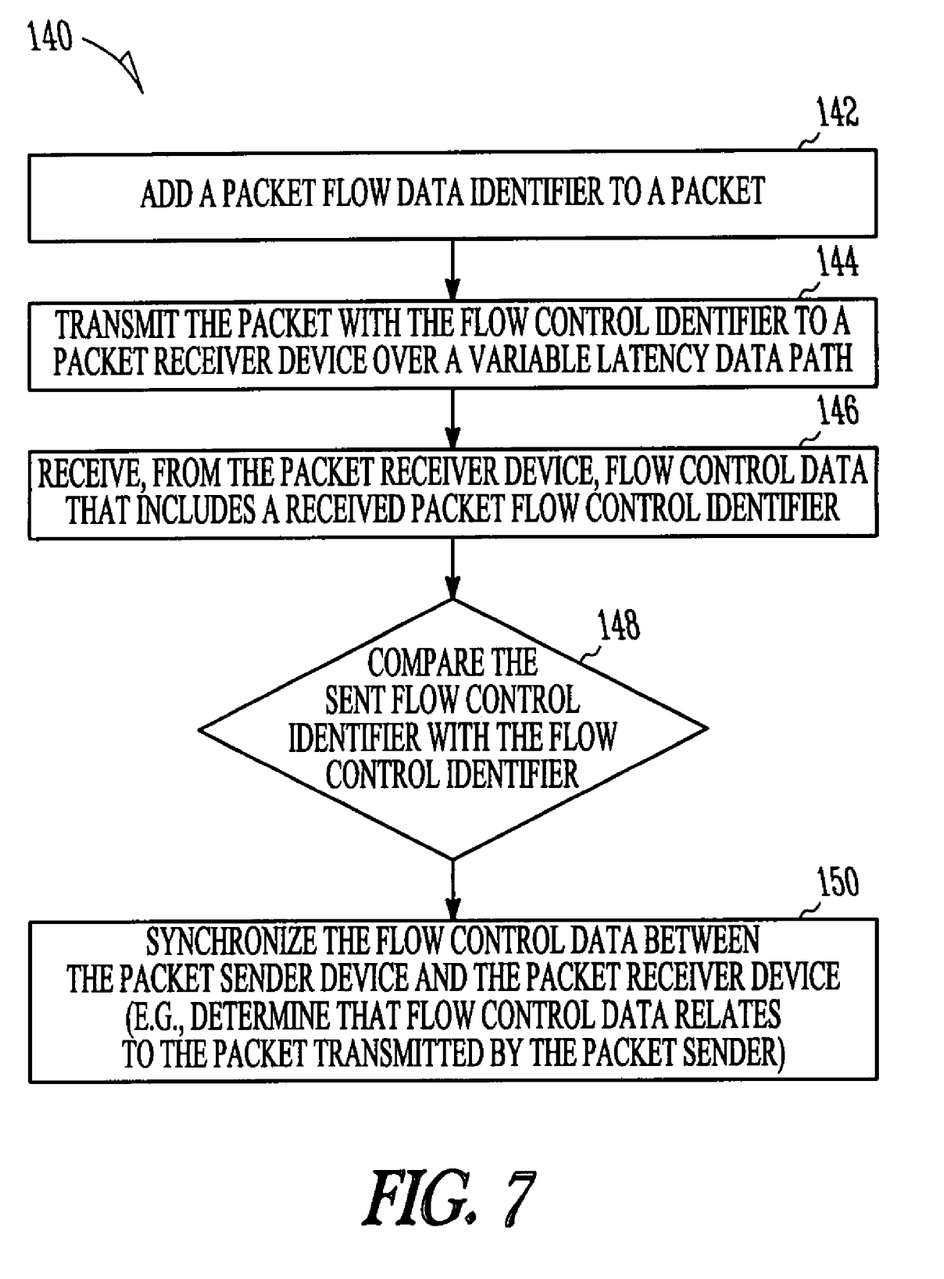
FIG. 7 shows a simplified flow diagram of a method, in accordance with an example embodiment, for flow control in a variable latency system.

FIG. 7 shows a simplified flow diagram of a method 140, in accordance with an example embodiment, for flow control in a variable latency system. In one example embodiment, the method may be implemented by the packet sender device 12 of FIG. 2, employed in a system, such as system 10 of FIG. 1.

As shown by block 142, the packet sender device 12, e.g., the sender flow control module 42, may add a flow control identifier to a packet, e.g., to the packet header. The flow control identifier may be used to mark a packet as part of a particular flow of packets. The packet header may have the format as shown in FIG. 6.

In an example embodiment, the sender communications module 40 of the packet sender device 12 may transmit the packet with the flow control identifier to the packet receiver device 16 over a variable latency data path (shown by block 144). As mentioned, the variable latency data path may be a PCI bus.

In order to manage flow control in the system 10, the packet receiver device 16 may communicate flow control data, to the packet sender device 12, for packets received from the packet sender device 12. The flow control data may include the flow control identifier. In an example embodiment, the sender communications module 40 of the packet sender device 12 receives the flow control data, including the received flow control identifier, from the packet receiver device 16 (shown by block 146) and, as shown by block 148, may compare the sent flow control identifier originally transmitted with the received flow control identifier. By comparing the originally sent flow control identifier with the received flow control identifier, the packet sender device 12 may determine whether the flow control data between the packet sender device 12 and the packet receiver device 16 is synchronized. This may be accomplished in that it may then be determined whether the received flow control identifier relates to the last packet transmitted by the packet sender device 12 (see block 150). If such synchronization has occurred, the packet sender device 12 is configured to rely on any additional data flow information that may have been transmitted as part of the flow control data.

FIGS. 8A to 8D show a detailed flow diagram of a method 160, in accordance with an example embodiment, for flow control in a variable latency system. The method 160 is shown as operations conducted, in accordance with one example embodiment, by the packet sender device 12 of FIG. 2 and the packet receiver device 16 of FIG. 3, employed in a system, such as system 10 of FIG. 1.

Figure 8A:
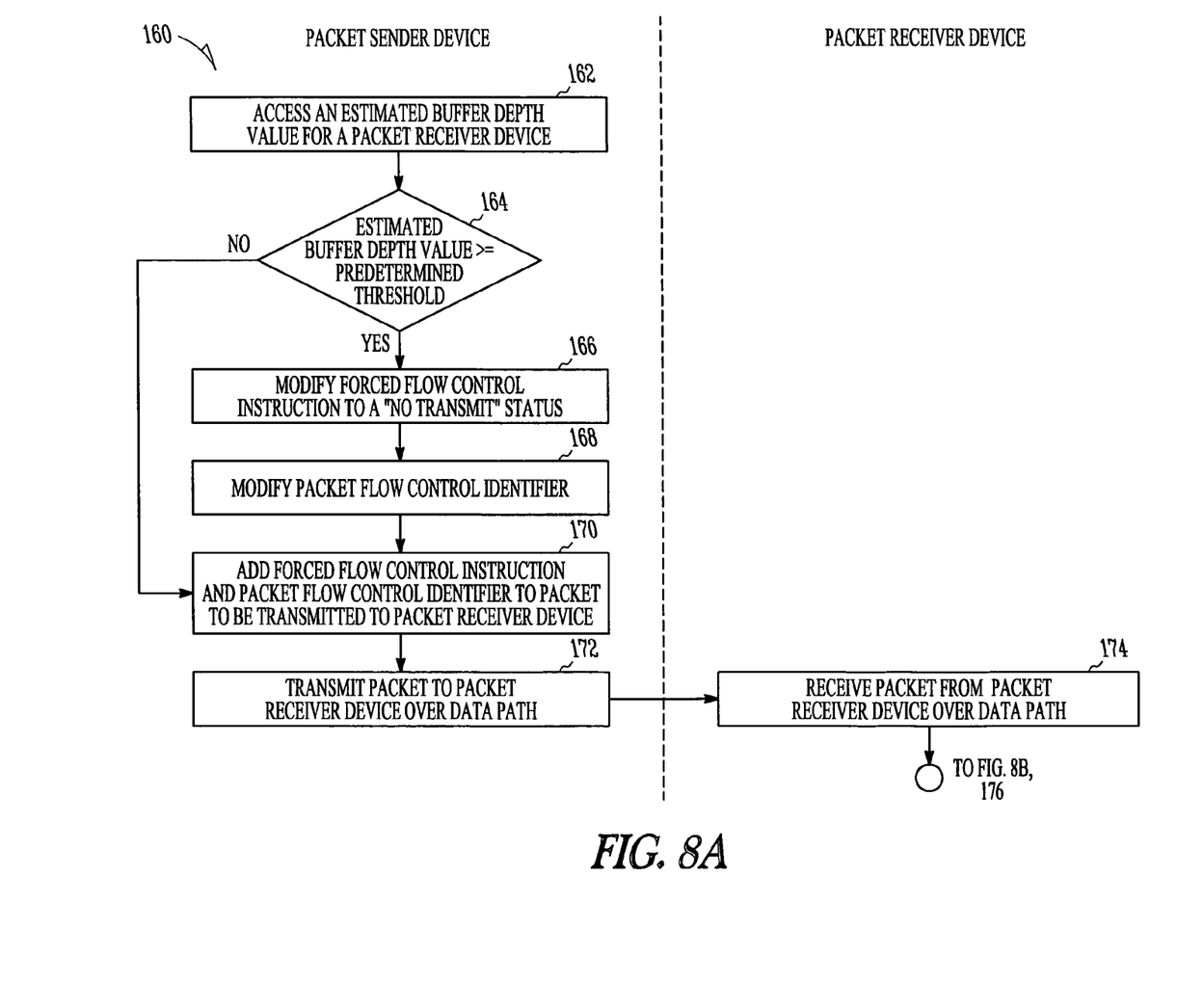
FIGS. 8A to 8D show a detailed flow diagram of a method, in accordance with an example embodiment, for flow control in a variable latency system.

In an example embodiment, the packet sender device 12 may maintain a sender buffer register, e.g., the sender buffer register 80 of FIG. 4, as described above. As shown by block 162, the packet sender device 12 may, prior to transmitting a data packet to the packet receiver device 16, access an estimated buffer depth value for the packet receiver device 16, which value may be maintained in the sender buffer register 80. The sender buffer module 44 of the packet sender device 12 may compare the buffer depth value with a predetermined minimum or threshold value in order to determine whether the buffer depth value has reached the predetermined minimum value (shown by block 162). The buffer depth value may be that value at which the receiver device generates an XOFF command.

The buffer depth value may be maintained in the sender buffer register by the sender buffer module 44. For example, every time a packet is transmitted to a particular packet receiver device, the sender buffer module 44 may update the sender buffer register 80. The sender buffer module 44 may, as described above, utilize flow control data received from a particular packet receiver device to maintain the value of the particular packet receiver device 16 in the sender buffer register 80.

As shown by block 166, if the sender buffer module 44 determines that the estimated buffer depth value of the packet receiver device has been reached, it may modify a forced flow control instruction, which may also be maintained in the sender buffer register, to an XOFF state. For example, the forced flow control instruction may be a bit that is to be added to a packet header of a packet to be transmitted to the packet receiver device 12 which, upon receipt thereof, forces the receiver device 16 into an XOFF state. In one example, a forced flow control instruction with a value of "0", may relate to an XON state, while a value of "1" may relate to an XOFF state. If the sender buffer module 44 therefore determines that the estimated buffer depth value of the packet receiver device 16 has been reached, it may modify the forced flow control instruction to a value of "1". This value may be stored in the sender buffer register 80.

If the sender buffer module 44 determines that the estimated buffer depth value is equal or above the predetermined minimum value or threshold, the sender buffer module 44 may also modify the flow control identifier to a new value, e.g., by toggling the flow control identifier to a different value (shown by block 168). The modified forced flow control identifier may then be added to the packet to be transmitted to the packet receiver device, e.g., as part of the packet header, together with the flow control identifier (shown by block 170). The forced flow control instruction and flow control identifier may be transmitted over the data path to the packet receiver device 16 (shown by block 172).

A record of the flow control identifier is also maintained in the sender buffer register 80 by the sender flow control module 42 of the packet sender device 12, and the sender flow control module 42 may be configured to add both the flow control identifier and the forced flow control instruction to the header of the data packet.

In the event that the sender buffer module 44 determined that the estimated buffer depth value is below the predetermined minimum value or threshold, the forced flow control instruction need not be modified, and the forced flow control instruction will remain at its previous value (e.g., a value of "0", which represent an XON state). Similarly, the flow control identifier will remain the same as its previous value.

As shown by block 174, the communications module 60 of the packet receiver device 16 may now receive the packet including the flow control identifier and the forced flow control instruction from the packet sender device.

Figure 8B:
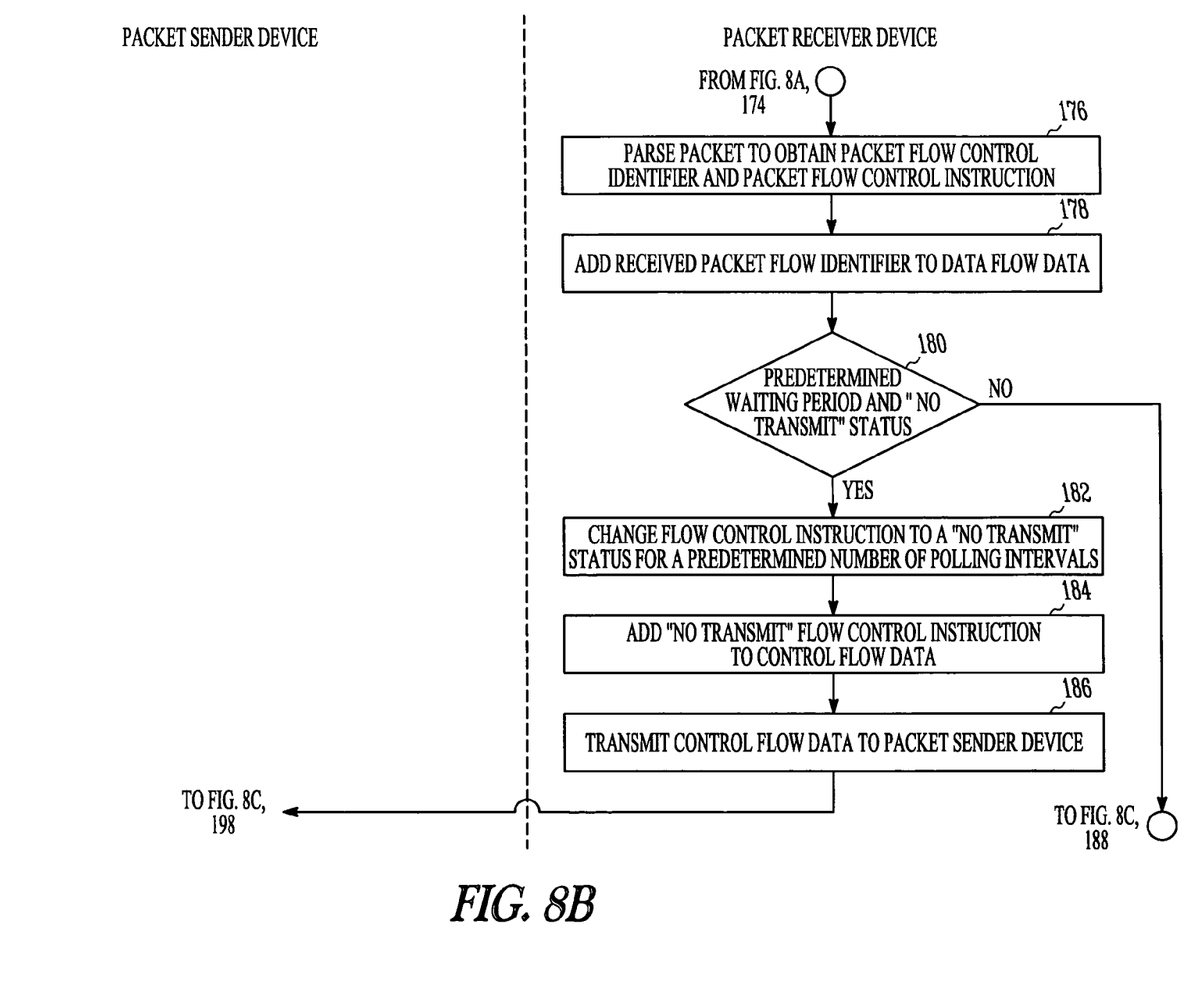

In an example embodiment, the receiver flow control module 62 of the packet receiver device 16 may parse the header of the received packet to obtain the flow control identifier and the flow control instruction (see block 176 of FIG. 8B). This flow control identifier may then be added, by the receiver flow control module 62, as a received flow control identifier to flow control data that is to be communicated back to the packet sender device 12 (shown by block 178). The receiver flow control module 62 may further store the flow control identifier received from the packet sender device 12 in a receiver buffer register, e.g., the receiver buffer register 100 of FIG. 5.

In one example embodiment, and as shown by block 180, the packet receiver device 16 may enter a predetermined waiting period may be entered during which the packet sender device 12 enters an XOFF state (see block 182).

The receiver buffer module 64 may update the flow control instruction in the receiver buffer register 100. For example, the flow control instruction may be changed to an XOFF (no transmit) status for a predetermined number of polling intervals (see block 182). Thereafter, as shown by block 184, the receiver flow control module 62 may then add the flow instruction with an XOFF status to control flow information that is transmitted back to the packet sender device 12 (see block 186). The packet sender device 12 may then receive the flow control data (see block 198 of FIG. 8C). All flow control data transmitted back to the packet sender device 12 during the predetermined number of polling intervals may include the "no transmit" status and will provide confirmation to the packet sender device 12 that the receiver device 12 is in an XOFF state. Thus, confirmation may be obtained that the actual buffer depth value of the packet receiver device 16 has reached a predetermined minimum level or threshold (as shown by block 188 of FIG. 8C). This predetermined minimum level may be defined by an operator of the packet receiver device 16 or may be inherit to the functioning of the packet receiver device 16.

Figure 8C:
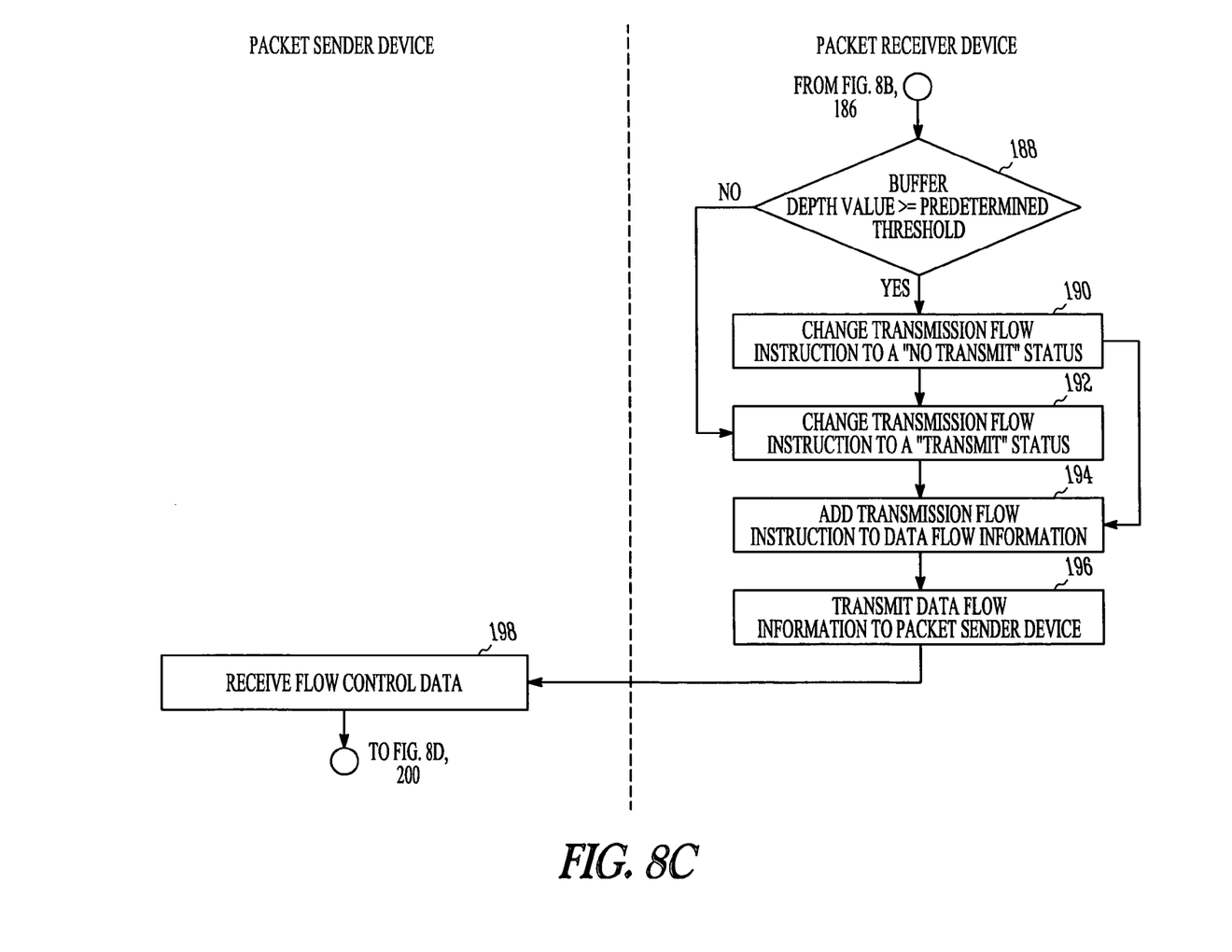

As shown by block 190, in the event that the receiver buffer module 64 determines that the buffer depth value of the packet receiver device 16 has reached the predetermined minimum level or threshold, the receiver buffer module 64 may change or modify the flow control instruction to XOFF status. Similarly, and as shown by block 192, in the event that the receiver buffer module 64 determines that the buffer depth value has not reached the predetermined minimum level, the receiver buffer module 64 may change or modify the transmission flow instruction to a "transmit" status (or XON state). These state changes may be recorded by the receiver buffer module 64 in the receiver buffer register 100.

The control flow data, including the flow control instruction and the flow control identifier, may be sent to the packet sender device 12 transmitted to the packet sender device 12 (see blocks 194 and 196).

The packet sender device 12 may receive the flow control data (as shown by block 198), and may use the data to identify into what state the packet receiver device 16 entered into in response to the last packet.

Figure 8D:
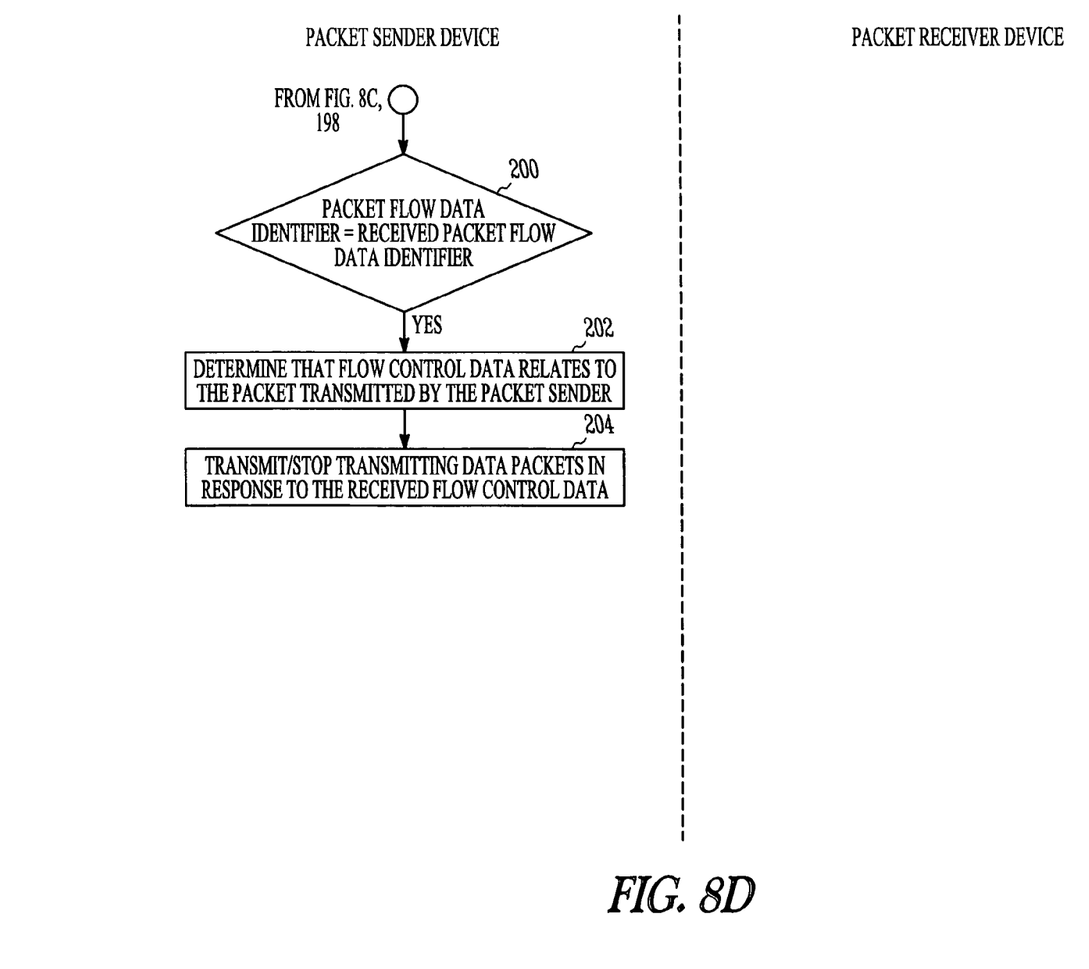

For example, and as shown by block 200 of FIG. 8D, the packet sender device 12 may, on receiving the flow control data, compare the flow control identifier originally transmitted with the data packet to the received flow control identifier. By comparing the originally transmitted flow control identifier with the received flow control identifier, the packet sender device 12 is able to determine whether the flow control data between the packet sender device 12 and the packet receiver device 16 has been synchronized, e.g., whether the flow control data relates to the packet transmitted by the packet sender (shown by block 202). Based on this information, the packet sender device 12 determines whether to transmit further data packets to the packet receiver device 16 (e.g., if the transmission flow instruction has a "transmit" status (or XON)), or whether not to transmit further data packets to the packet receiver device 16 (e.g., if the transmission flow instruction has a "no transmit" status (or XOFF)). This is shown by block 204.

For example, if the packet sender device 12 determines that the flow control identifier stored in the sender buffer register 80 corresponds to the received flow control identifier, the packet sender device 12 can trust the transmission flow instruction, irrespective of whether the transmission flow instruction is set to XON or XOFF. However, if the packet sender device 12 determines that the flow control identifier stored in the sender buffer register 80 does not correspond to the received flow control identifier, the packet sender device 12 may determine that the received flow control data relates to older packets that have been transmitted (prior to the change of the flow control identifier) and may ignore the transmission flow instruction that accompanies the flow control data received from the packet receiver device.

Figure 9:
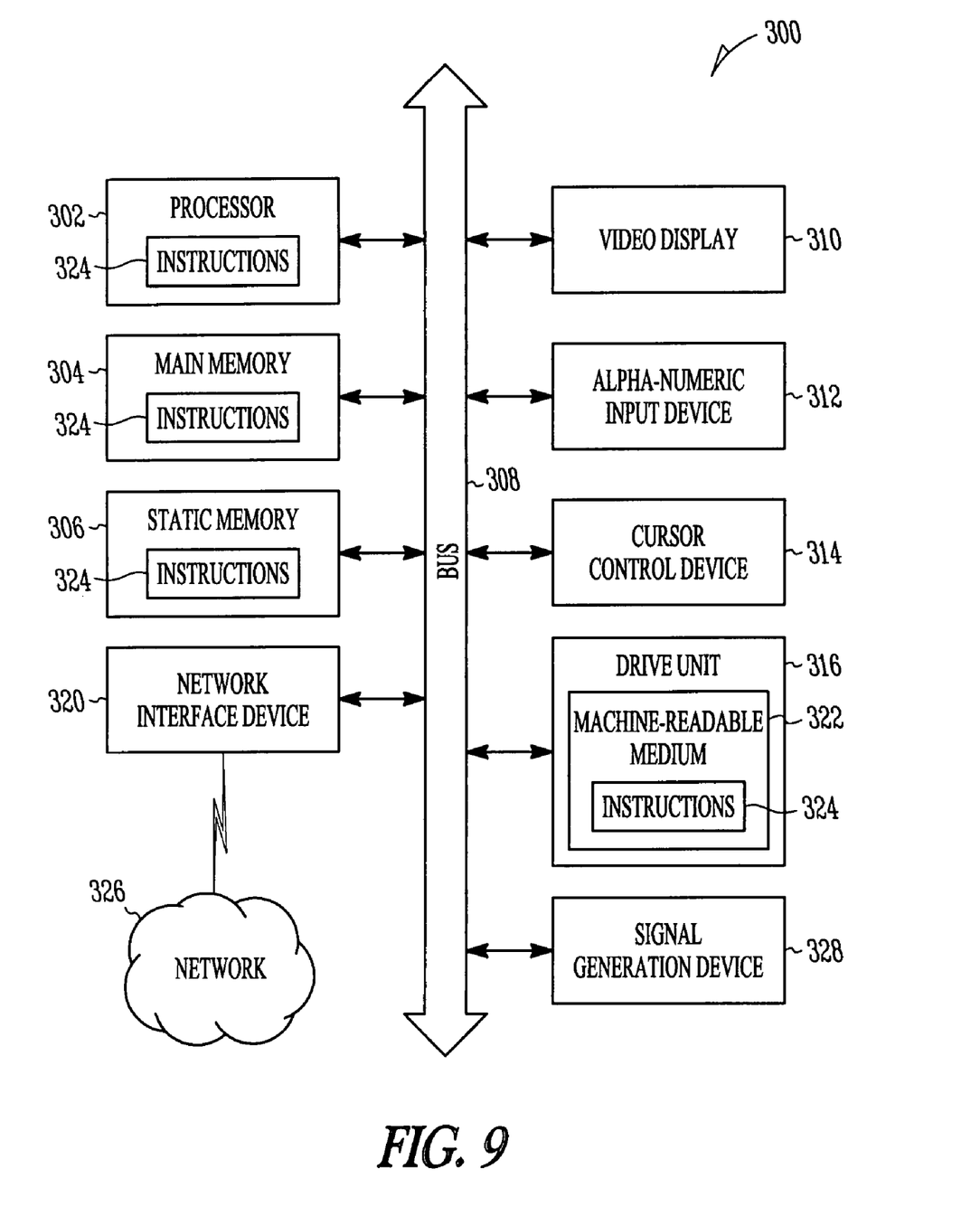
FIG. 9 shows a diagrammatic representation of machine in the example form of a computer system within which a set of instructions, for causing the machine to perform any one or more of the methodologies discussed herein, may be executed.

FIG. 9 shows a diagrammatic representation of machine in the example form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 300 includes a processor 302 (e.g., a central processing unit (CPU), a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a user interface (UI) navigation device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions and data structures (e.g., software 324) embodying or utilized by any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320 utilizing any one of a number of well-known transfer protocols (e.g., FTP).

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising: at a packet sender device, adding a flow control identifier to a packet, the flow control identifier being based on: storing an estimated buffer depth for a packet receiver device; and determining if the stored estimated buffer depth has reached a minimum; adding a flow control instruction to the packet to instruct the packet receiver device to enter a "no transmit" state; sending the packet with the flow control identifier and the flow control instruction to the packet receiver device over a data path; receiving, from the packet receiver device, flow control data that includes a received flow control identifier generated in response to the sent flow control identifier, the received flow control identifier identifying a state of the receiver buffer in response to receiving the last packet sent by the packet sender device; comparing the sent flow control identifier with the received flow control identifier to determine when flow control data between the packet sender device and the packet receiver device is synchronized; and modifying a transmission flow control instruction based on the comparison.

2. The method of claim 1, further comprising: at the packet receiver device, in response to receiving the flow control instruction, determining if a buffer depth of the packet receiver device has reached a predetermined minimum value.

3. The method of claim 2, further comprising forcing the transmission flow instruction to a transmitter "off" status for a predetermined number of polling intervals in response to receipt of the flow control instruction.

4. The method of claim 2, further comprising:
at the packet receiver device,
in response to determining that the buffer depth of the packet receiver device has not reached a predetermined minimum value, transmitting the received flow instruction to indicate a transmitter "on" status to the packet sender device.

5. The method of claim 2, wherein the flow control instruction is a bit added to a packet header of the packet to be transmitted to the packet receiver device.

6. The method of claim 1, wherein the flow control identifier is a bit added to a packet header of the packet to be transmitted to the packet receiver device.

7. The method of claim 1, wherein comparing the sent flow control identifier with the received flow control identifier to determine when flow control data between the packet sender device and the packet receiver device is synchronized comprises determining the flow control data is synchronized when the sent flow control identifier matches the received flow control identifier.

8. A system comprising: a packet sender device comprising: a sender flow control module configured to add a flow control identifier to a packet, the flow control identifier being based on accessing an estimated buffer depth for a packet receiver device, the estimated buffer depth stored on the packing packet sending device, and a determination if the estimated buffer depth has reached a minimum, the sender flow control module further configured to add a flow control instruction to the packet to instruct the packet receiver device to enter a "no transmit" state; a sender communications module configured to transmit the packet with the flow control identifier and the flow control instruction to the packet receiver device over a data path and to receive from the packet receiver device a received flow control identifier, the received flow control identifier identifying a state of the receiver buffer in response to receiving the last packet sent by the packet sender device; and a sender buffer module configured to compare the sent flow control identifier with the received flow control identifier to determine when flow control data between the packet sender device and the packet receiver device is synchronized, and to modify a transmission flow control instruction based on the comparison.

9. The system of claim 8, wherein the packet receiver device comprises:
a communications module to receive the packet with the flow control identifier from the packet sender device; and
a receiver flow control module to add the received flow control for transmission to the packet sender device.

10. The system of claim 8, wherein the packet receiver device further comprises a receiver buffer module configured to determine, in response to receiving the flow control instruction, if a buffer depth of the packet receiver device has reached a predetermined minimum value.

11. The system of claim 10, wherein the receiver buffer module, in response to determining that the buffer depth of the packet receiver device has not reached a predetermined minimum value, is configured to transmit the received flow control instruction with a transmitter "on" status to the packet sender device.

12. The system of claim 11, wherein the receiver flow control module is configured to force the packet receiver device into a transmitter "off" state for a predetermined number of polling intervals.

13. The system of claim 8, wherein the flow control instruction is a bit added to a packet header of the packet to be transmitted to the packet receiver device.

14. The system of claim 9, wherein the flow control identifier is a bit added to a packet header of the packet to be transmitted to the packet receiver device.

15. The system of claim 9, wherein the packet transmitter device is a host processor and the packet receiver device is a network interface card, the system further comprising a Peripheral Component Interconnect (PCI) bus to connect the host processor and the network interface card.

16. The system of claim 8, wherein the sender buffer module is configured to determine the flow control data is synchronized when the sent flow control identifier matches the received flow control identifier.

17. A packet sender device comprising: means for adding a flow control identifier to a packet, the flow control identifier being based on accessing an estimated buffer depth for a packet receiver device, the estimated buffer depth stored on the packet sending device, and a determination if the estimated buffer depth has reached a minimum; means for adding a flow control instruction to the packet to instruct the packet receiver device to enter a "no transmit" state; means for transmitting a packet with the packet flow control identifier and the flow control instruction to the packet receiver device over a data path; means for receiving, from the packet receiver device, flow control data that includes a received flow control identifier generated in response to the sent flow control identifier, the received flow control identifier identifying a state of the receiver buffer in response to receiving the last packet sent by the packet sender device; means for comparing the sent flow control identifier with the received flow control identifier to determine when flow control data between the packet sender device and the packet receiver device is synchronized; and means for modifying a transmission flow control instruction based on the comparison.

18. A non-transitory machine-readable medium embodying instructions which, when executed by a machine, cause the machine to: at a packet sender device, add a flow control identifier to a packet, the flow control identifier being based on accessing an estimated buffer depth for a packet receiver device, the estimated buffer depth stored on the packet sending device, and a determination if the estimated buffer depth has reached a minimum; add a flow control instruction to the packet to instruct the packet receiver device to enter a "no transmit" state; transmit a packet with the packet flow control identifier and the flow control instruction to the packet receiver device over a data path; receive, from the packet receiver device, flow control data that includes a received flow control identifier generated in response to the sent flow control identifier, the received flow control identifier identifying a state of the receiver buffer in response to receiving the last packet sent by the packet sender device; compare the sent flow control identifier with the received flow control identifier to determine when flow control data between the packet sender device and the packet receiver device is synchronized; and modify a transmission flow control instruction based on the comparison.

* * * * *

UNITED STATES PATENT AND TRADEMARK OFFICE
CERTIFICATE OF CORRECTION

PATENT NO.        : 8,199,648 B2
APPLICATION NO.   : 11/773351
DATED             : June 12, 2012
INVENTOR(S)       : Holmes et al.

It is certified that error appears in the above-identified patent and that said Letters Patent is hereby corrected as shown below:

In column 11, line 54, In Claim 1, after "comprising:", insert --¶--, therefor

In column 11, line 54, In Claim 1, after "device,", insert --¶--, therefor

In column 11, line 56, In Claim 1, after "on:", insert --¶--, therefor

In column 11, line 57, In Claim 1, after "and", insert --¶--, therefor

In column 11, line 58, In Claim 1, after "minimum;", insert --¶--, therefor

In column 11, line 60, In Claim 1, after "state;" insert --¶--, therefor

In column 11, line 62, In Claim 1, after "path;", insert --¶--, therefor

In column 11, line 67, In Claim 1, after "device;", insert --¶--, therefor

In column 12, line 4, In Claim 1, after "and", insert --¶--, therefor

In column 12, line 6, In Claim 2, after "comprising:", insert --¶--, therefor

In column 12, line 7, In Claim 2, after "device,", insert --¶--, therefor

In column 12, line 34, In Claim 8, after "comprising:", insert --¶--, therefor

In column 12, line 34-35, In Claim 8, after "comprising:", insert --¶--, therefor In column 12, line 43, In Claim 8, after "state;", insert --¶--, therefor In column 12, line 50, In Claim 8, after "and", insert --¶--, therefor In column 13, line 26, In Claim 17, after "comprising:", insert --¶--, therefor In column 13, line 31, In Claim 17, after "minimum;", insert --¶--, therefor In column 13, line 33, In Claim 17, after "state;", insert --¶--, therefor In column 14, line 1, In Claim 17, after "path;", insert --¶--, therefor In column 14, line 6, In Claim 17, after "device;", insert --¶--, therefor In column 14, line 10, In Claim 17, after "and", insert --¶--, therefor In column 14, line 14, In Claim 18, after "to:", insert --¶--, therefor In column 14, line 14, In Claim 18, after "device,", insert --¶--, therefor Signed and Sealed this
Sixth Day of November, 2012

David J. Kappos
*Director of the United States Patent and Trademark Office*

CERTIFICATE OF CORRECTION (continued)
U.S. Pat. No. 8,199,648 B2

In column 14, line 19, In Claim 18, after "minimum;", insert --¶--, therefor

In column 14, line 21, In Claim 18, after "state:", insert --¶--, therefor

In column 14, line 23, In Claim 18, after "path:", insert --¶--, therefor

In column 14, line 28, In Claim 18, after "device", insert --¶--, therefor

In column 14, line 32, In Claim 18, after "and", insert --¶--, therefor